US012704797B2

(12) United States Patent
Kawabata et al.

(10) Patent No.: US 12,704,797 B2
(45) Date of Patent: Aug. 11, 2026

(54) CHARGING MEMBER WITH RESIN-BASED SURFACE LAYER CONTAINING CONDUCTIVE INORGANIC PARTICLES

(71) Applicant: FUJIFILM Business Innovation Corp., Tokyo (JP)

(72) Inventors: Yukimi Kawabata, Kanagawa (JP); Kenta Yamakoshi, Kanagawa (JP); Takuya Yamamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/922,679

(22) Filed: Oct. 22, 2024

(65) Prior Publication Data

US 2025/0199435 A1 Jun. 19, 2025

(30) Foreign Application Priority Data

Dec. 13, 2023 (JP) ................................ 2023-210481
Jun. 19, 2024 (JP) ................................ 2024-099045

(51) Int. Cl.
*G03G 15/02* (2006.01)
*G03G 21/18* (2006.01)

(52) U.S. Cl.
CPC ..... *G03G 15/0233* (2013.01); *G03G 21/1814* (2013.01)

(58) Field of Classification Search
CPC ....................... G03G 15/0233; G03G 21/1814
See application file for complete search history.

(56) References Cited

U.S. PATENT DOCUMENTS

2020/0301306 A1 9/2020 Kinuta et al.
2023/0288834 A1 9/2023 Suzuki et al.
2023/0314979 A1* 10/2023 Suzuki .............. G03G 15/0233
399/176

FOREIGN PATENT DOCUMENTS

JP 2001-005262 A 1/2001
JP 2010-113177 A 5/2010
JP 5173247 B2 4/2013
JP 2019-219498 A 12/2019

OTHER PUBLICATIONS

May 2, 2025 Extended Search Report issued in European Patent Application No. 24209268.2.

* cited by examiner

*Primary Examiner* — Hoang X Ngo
(74) *Attorney, Agent, or Firm* — Oliff PLC

(57) ABSTRACT

A charging member includes a support member, an elastic layer provided on the support member, and a surface layer provided on the clastic layer, in which the surface layer contains a resin, conductive particles, and non-conductive inorganic particles, and the surface layer contains 5 parts by mass or more and 40 parts by mass or less of the non-conductive inorganic particles relative to 100 parts by mass of the resin.

20 Claims, 4 Drawing Sheets

CHARGING MEMBER WITH RESIN-BASED SURFACE LAYER CONTAINING CONDUCTIVE INORGANIC PARTICLES

CROSS-REFERENCE TO RELATED APPLICATIONS

This application is based on and claims priority under 35 USC 119 from Japanese Patent Application Nos. 2023-210481 filed Dec. 13, 2023 and 2024-099045 filed Jun. 19, 2024.

BACKGROUND

(i) Technical Field

The present disclosure relates to a charging member, a charging device, a process cartridge, and an image forming apparatus.

(ii) Related Art

Japanese Unexamined Patent Application Publication No. 2001-005262 discloses a charging member including a conductive support, a semiconductive elastic layer, and a protective layer, the protective layer containing a polyamide resin, a fluorine resin, a polyvinyl butyral resin or a polyester resin.

Japanese Unexamined Patent Application Publication No. 2010-113177 discloses a conductive roller which includes a shaft body, an elastic layer, and a surface layer and charges a body to be charged by contact with the body to be charged in a state where a voltage is applied. The surface layer has insulating particles, and the insulating particles are partially disposed so that at least two or more particles are overlapped each other in the thickness direction. The insulating particles are 12 nylon particles.

Japanese Unexamined Patent Application Publication No. 2019-219498 discloses a conductive roller including a core, a rubber substrate, and a surface layer, the surface layer including a conductive matrix and insulating particles dispersed in the conductive matrix, and the insulating particles containing large particles and small particles.

SUMMARY

Aspects of non-limiting embodiments of the present disclosure relate to a charging member which hardly causes density unevenness of an image and hardly causes a crack in the surface as compared with a charging member in which a surface layer contains less than 5 parts by mass or over 40 parts by mass of non-conductive inorganic particles relative to 100 parts by mass of a resin.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a charging member including a support member, an elastic layer provided on the support member, and a surface layer provided on the elastic layer, wherein the surface layer contains a resin, conductive particles, and non-conductive inorganic particles, and the surface layer contains 5 parts by mass or more and 40 parts by mass or less of the non-conductive inorganic particles relative to 100 parts by mass of the resin.

BRIEF DESCRIPTION OF THE DRAWINGS

Exemplary embodiments of the present disclosure will be described in detail based on the following figures, wherein.

DETAILED DESCRIPTION

Figure 1:
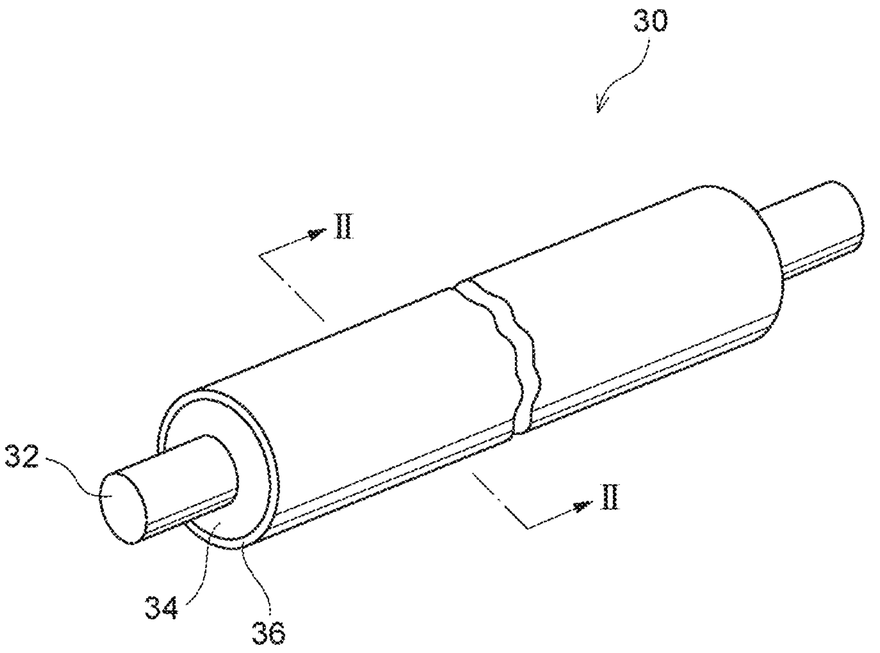
FIG. 1 is a schematic perspective view showing an example of a charging member according to an exemplary embodiment of the present disclosure.

Exemplary embodiments of the present disclosure are described below. The description and examples illustrate the exemplary embodiments and do not limit the scopes of the exemplary embodiments.

In the present disclosure, "A and/or B" represents the same meaning as "at least one of A and B". That is, "A and/or B" represents may be only A, only B, or combination of A and B.

In the present disclosure, a numerical value range shown using "to" represents a range containing numerical values described in front of and behind "to" as the maximum value and the minimum values, respectively.

In the numerical ranges stepwisely described in the present disclosure, the upper limit value or lower limit value described in one of the numerical ranges may be replaced by the upper limit value or the lower limit value of another numerical range stepwisely described. Also, in a numerical range described in the exemplary embodiment, the upper limit value or lower limit value of the numerical range may be replaced by the value described in an example.

In the present disclosure, the term "process" includes not only an independent process but also even a process which cannot be clearly discriminated from another process if the intended purpose of the process can be achieved.

In the present disclosure, when the exemplary embodiment is described with reference to drawings, the configuration of the exemplary embodiment is not limited to the configuration shown in the drawings. In addition, in each of the drawings, the size of a member is conceptual, and the relative relationship between the sizes of members is not limited to that shown in the drawings.

In the present disclosure, each of the components may contain plural materials corresponding to the component. In the present disclosure, when the amount of each of the components in a composition is described and when plural materials corresponding each of the components are present in the composition, the amount represents the total amount of the plural materials present in the composition unless otherwise specified.

In the present disclosure, the "axial direction" of a charging member represents the direction in which the rotational axis of the charging member is extended, and the "circumferential direction" of a charging member represents the rotational direction of the charging member.

<Charging Member>

A charging member according to an exemplary embodiment of the present disclosure includes a support member, an elastic layer provided on the support member, and a surface layer provided on the elastic layer. The surface layer is the outermost layer of the charging member according to the exemplary embodiment.

Figure 2:
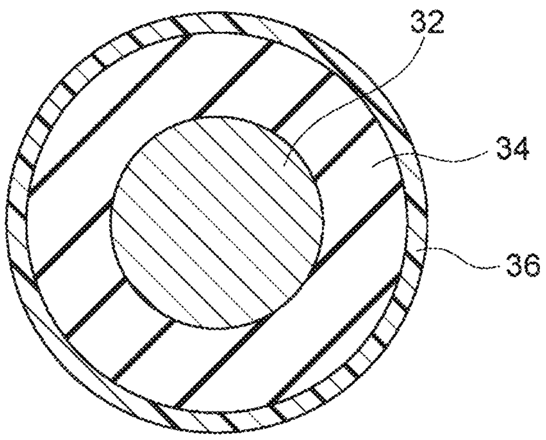
FIG. 2 is a schematic sectional view, which is a II-II sectional view of FIG. 1, showing an example of a charging member according to an exemplary embodiment of the present disclosure.

FIG. 1 is a schematic perspective view showing an example of the charging member according to the exemplary embodiment. FIG. 2 is a II-II sectional view of FIG. 1, which is a sectional view taken along the radial direction of the charging member shown in FIG. 1.

A charging member 30 shown in FIG. 1 is a roll-shaped charging member. The charging member 30 has a structure in which an elastic layer 34 and a surface layer 36 are laminated in this order on a support member 32. The charging member 30 may have an adhesive layer (not shown) between the support member 32 and the elastic layer 34 and/or between the elastic layer 34 and the surface layer 36. The surface layer 36 is the outermost layer of the charging member 30.

The shape of the charging member according to the exemplary embodiment is not limited to a roll shape and may be a belt shape, a tube shape, a blade shape, or the like.

In the charging member according to the exemplary embodiment, the surface layer contains a resin, conductive particles, and non-conductive inorganic particles, and the surface layer contains 5 parts by mass or more and 40 parts by mass or less of the non-conductive inorganic particles relative to 100 parts by mass of the resin.

The charging member according to the exemplary embodiment has the configuration described above and thus hardly causes density unevenness of an image and hardly causes a crack in the surface. The reason for this is supposed as follows.

When an image is formed over a long period, dirt is gradually accumulated on the surface of the charging member. The dirt is mainly derived from a toner. The dirt on the charging member easily occurs on a charging member of a system in contact with the surface of a photoreceptor and may occur on a charging member of a system in noncontact with the surface of a photoreceptor due to electrostatic adsorption of a toner.

In addition, when an image is continuously formed, the temperature of the charging member is increased, and the component of the surface layer of the charging member chemically reacts with the component derived from a toner, forming a contaminated layer due to fixing of contaminants to the surface of the charging member. The contaminated layer causes discharge unevenness in the charging member, and thus density unevenness occurs in an image. Also, a crack easily occurs in the contaminated layer because the layer is relatively fragile, and thus a crack also occurs in the charging member from the crack, as a starting point, in the contaminated layer.

Regarding the phenomenon described above, the charging member according to the exemplary embodiment includes the surface layer containing the inorganic particles, which are particles having excellent thermal conductivity, for the purpose of enhancing heat dissipation of the charging member. The inorganic particles contained in the surface layer for the purpose of thermal conductivity are non-conductive so as not to influence the electrical characteristics of the charging member even at a relatively high content.

The surface layer containing the non-conductive inorganic particles has excellent heat dissipation and thus suppresses an increase in temperature of the charging member. Consequently, the chemical reaction between the component of the surface layer of the charging member and the component derived from a toner and the formation of the contaminated layer are suppressed. Therefore, the charging member according to the exemplary embodiment hardly causes density unevenness of an image and hardly causes a crack in the surface.

In the present disclosure, with respect to the difference between non-conductive and conductive particles relating to the particles contained in the surface layer, particles having a volume resistivity of $1\times10^{8}$ Ω·cm or more are non-conductive particles, and particles having a volume resistivity of less than $1\times10^{8}$ Ω·cm are conductive particles.

A method for measuring the volume resistivity of the particles contained in the surface layer is as follows.

The particles to be measured are filled in a sample holder of a powder resistance measuring device and compressed by applying a load of 20 kN. The measurement is performed at an applied voltage of 90 V and a load of 4 kN in an environment at a temperature of 23° C. and a relative humidity of 50%.

The particles subjected to the measurement are particles of a material which forms the surface layer or particles taken out from the surface layer. A method for taking out the particles from the surface layer is not limited. Examples of the method include a method for taking out the particles by immersing the surface layer, separated from the charging member, in an organic solvent which dissolves a binder resin to dissolve the binder resin in the organic solvent, a method for taking out the particles by heating the surface layer, separated from the charging member, to high temperature to cause the binder resin to disappear, and the like.

In the charging member according to the exemplary embodiment, the content of the non-conductive inorganic particles in the surface layer is 5 parts by mass or more and 40 parts by mass or less relative to 100 parts by mass of the resin.

From the viewpoint of thermal conductivity and heat dissipation of the surface layer, the content of the non-conductive inorganic particles in the surface layer is 5 parts by mass or more, preferably 10 parts by mass or more, and more preferably 15 parts by mass or more relative to 100 parts by mass of the resin.

From the viewpoint that a crack hardly occurs in the surface layer, the content of the non-conductive inorganic particles in the surface layer is 40 parts by mass or less, preferably 30 parts by mass or less, and more preferably 25 parts by mass or less.

In the charging member according to the exemplary embodiment, from the viewpoint of suppressing the occurrence of the contaminated layer on the surface of the charging member, the thermal conductivity from the lower surface of the elastic layer to the upper surface of the surface layer is preferably 0.4 W/(m·K) or more, more preferably 0.5 W/(m·K) or more, and still more preferably 0.6 W/(m·K) or more.

The thermal conductivity from the lower surface of the elastic layer to the upper surface of the surface layer may be, for example, 5.0 W/(m·K) or less, 4.0 W/(m·K) or less, or 3.0 W/(m·K) or less.

A method for measuring the thermal conductivity from the lower surface of the elastic layer to the upper surface of the surface layer concerning the charging member is as follows.

All layers from the elastic layer to the surface layer in a central portion in the axial direction of the charging member are cut out to a length of 5 mm in the axial direction×a length of 2 mm in the circumferential direction, forming a sample. The thermal diffusivity in the thickness direction (that is, the direction from the lower surface of the elastic layer to the upper surface of the surface layer) is measured at room temperature (25° C.±3° C.) by using a thermal diffusivity measuring device (FOX50, manufactured by Waters Corporation). The thermal conductivity (W/(m·K)) is calculated by multiplying the thermal diffusivity by specific heat and density.

A method for measuring the specific heat is as follows.

All layers from the elastic layer to the surface layer in a central portion in the axial direction of the charging member is cut out to a length of 5 mm in the axial direction×a length of 2 mm in the circumferential direction, and the length in the axial direction and the length in the circumferential direction are adjusted so that the mass of a sample is 25 mg, forming a sample. The sample is measured by using an input compensation scanning differential calorimeter (Diamond DSC, manufactured by PerkinElmer Inc.) according to JIS K 7123:2012, and the specific heat is calculated.

A method for measuring the density is as follows.

All layers from the elastic layer to the surface layer in a central portion in the axial direction of the charging member is cut out to a length of 5 mm in the axial direction×a length of 2 mm in the circumferential direction, forming a sample. The density is measured by using a dry density measuring device (Accupyc II 1340, manufactured by Micrometrics Inc.). Each of the layers of the charging member is described in detail below.

[Support Member]

The support member is a conductive member functioning as an electrode and a support of the charging member. The support member may be a hollow member or a non-hollow member and is, for example, a rod-shape, cylindrical-shape, or endless belt-shape member.

Examples of the support member include members of metals such as iron (free-cutting steel or the like), copper, a copper alloy, brass, stainless steel, aluminum, nickel, and the like; a member of iron plated with chromium, nickel, or the like; a member made of a resin or ceramic and having a plated outer peripheral surface; a member made of a resin or ceramic and containing a conductive agent; and the like.

[Elastic Layer]

The elastic layer has conductivity, and the volume resistivity at a temperature of 20° C. is preferably $1\times10^{3}$ Ω·cm or more and $1\times10^{14}$ Ω·cm or less.

The volume resistivity of the elastic layer is a value measured by the following method.

The surface layer of the charging member is removed by grinding, and then the elastic layer in a central portion in the axial direction of the charging member is cut out to a length of 25 mm in the axial direction×a length of 8 mm in the circumferential direction, forming a sample. The thickness of the sample (that is, the elastic layer) is measured. A voltage adjusted so that the electric field (applied voltage/composition sheet thickness) is 1000 V/cm is applied to the sample for 30 seconds using a measurement jig (R12702A/B resistivity chamber: manufactured by Advantest Corporation) and a high resistance measuring device (R8340A digital high resistance/microcurrent meter: manufactured by Advantest Corporation) according to JIS K 6911:1995. The current value is read, and the volume resistivity is calculated by a formula below.

$$\text{Volume resistivity } (\Omega\cdot\text{cm}) = (\text{sample area } (\text{cm}^2)\times \text{applied voltage (V)})/(\text{current value (A)}\times\text{sample thickness (cm)})$$

The elastic layer may be a foamed elastic layer or a non-foamed elastic layer. The elastic layer may be disposed directly on the outer peripheral surface of the support member or may be disposed on the outer peripheral surface of the support member through an adhesive layer.

In an exemplary embodiment, the elastic layer contains an elastic material, a conductive agent, and other additives.

Examples of the elastic material include elastic materials such as polyurethane, nitrile rubber, isoprene rubber, butadiene rubber, ethylene-propylene rubber, ethylene-propylene-diene rubber, epichlorohydrin rubber, epichlorohydrin-ethylene oxide rubber, epichlorohydrin-ethylene oxide-allyl glycidyl ether rubber, styrene-butadiene rubber, acrylonitrile-butadiene rubber, chloroprene rubber, chlorinated polyisoprene, hydrogenated polybutadiene, butyl rubber, silicone rubber, fluororubber, natural rubber, and a mixture of two or more of these materials. Among these elastic materials, polyurethane, silicone rubber, ethylene-propylene-diene rubber, epichlorohydrin-ethylene oxide rubber, epichlorohydrin-ethylene oxide-allyl glycidyl ether rubber, acrylonitrile-butadiene rubber, and a mixture of two or more of these materials are preferred.

Examples of the conductive agent include an electron conductive agent and an ion conductive agent. Examples of the electron conductive agent include powders of carbon black such as furnace black, thermal black, channel black, Ketjen black, acetylene black, color black, and the like; pyrolysis carbon; graphite; metals or alloys such as aluminum, copper, nickel, stainless steel, and the like; metal oxides such as tin oxide, indium oxide, titanium oxide, tin oxide-antimony oxide solid solution, tin oxide-indium oxide solid solution, and the like; a material produced by conductive treatment of the surface of an insulting material; and the like. Examples of the ion conductive agent include perchlorates or chlorates of tetraethyl ammonium, lauryltrimethylammonium, benzyltrialkylammonium, and the like; perchlorates or chlorates of alkali metals or alkaline earth metals such as lithium, magnesium and the like; and the like. The conductive agents may be used alone or in combination of two or more.

The total content of the conductive agent contained in the elastic layer is preferably determined in accordance with the volume resistivity of the elastic layer.

When the electron conductive agent is used as the conductive agent, the total amount of the electron conductive agent may be, for example, 1 part by mass or more and 20 parts by mass or less or 3 parts by mass or more and 20 parts by mass or less relative to 100 parts by mass of the elastic material.

When the ion conductive agent is used as the conductive agent, the total amount of the ion conductive agent may be, for example, 0.1 parts by mass or more and 10 parts by mass or less or 0.5 parts by mass or more and 5 parts by mass or less relative to 100 parts by mass of the clastic material.

The average primary particle diameter of the conductive agent is preferably 1 nm or more and 500 nm or less and more preferably 5 nm or more and 200 nm or less. The average primary particle diameter of the conductive agent is determined by measuring the long diameters of 100 conductive agent particles in a section of the elastic layer using an electron microscope, and then arithmetically averaging the measurement values.

The conductive agent is preferably carbon black. The average primary particle diameter of carbon black is preferably 1 nm or more and 500 nm or less and more preferably 5 nm or more and 200 nm or less.

The content of carbon black is preferably 1 part by mass or more and 20 parts by mass or less and more preferably 3 parts by mass or more and 10 parts by mass or less relative to 100 parts by mass of the elastic material.

Examples of other additives include a vulcanizing agent, a vulcanization accelerator, a vulcanization accelerating aid, a filler, a softener, a plasticizer, a curing agent, an antioxidant, a surfactant, a coupling agent, and the like.

Examples of the filler include calcium carbonate, silica, clay minerals, and the like. The fillers may be used alone or in combination of two or more.

The filler is preferably calcium carbonate. The content of calcium carbonate is preferably 1 part by mass or more and 50 parts by mass or less and more preferably 10 parts by mass or more and 40 parts by mass or less relative to 100 parts by mass of the elastic material.

The thickness of the elastic layer is preferably 5 mm or more and 20 mm or less and more preferably 10 mm or more and 15 mm or less The thickness of the elastic layer is measured by imaging a section using an electron microscope. The thickness is measured at 4 positions at intervals of 90° in the circumferential direction at the center in the axial direction of the charging member, and the arithmetic average value thereof is considered as the thickness of the elastic layer.

Examples of a method for forming the elastic layer on the support member include a method of extruding both a composition for forming an elastic layer, which is prepared by mixing an elastic material, a conductive agent, and other additives, and a cylindrical support member from an extrusion molding machine to form a composition layer for forming an elastic layer on the outer peripheral surface of the support member, and then performing crosslinking reaction (including vulcanization) by heating the composition layer for forming an elastic layer to form an elastic layer; a method of extruding a composition for forming an elastic layer, which is prepared by mixing an elastic material, a conductive agent, and other additives, on the outer peripheral surface of an endless belt-shape support member from an extrusion molding machine to form a composition layer for forming an elastic layer on the outer peripheral surface of the support member, and then performing crosslinking reaction (including vulcanization) by heating the composition layer for forming an elastic layer to form an elastic layer; and the like. The support member may have an adhesive layer on the outer peripheral surface thereof.

[Adhesive Layer]

An adhesive layer may be disposed between the support member and the elastic layer in order to bond to each other.

Examples of the adhesive layer interposed between the support member and the elastic layer include layers containing resins such as polyolefin resin, an acrylic resin, an epoxy resin, polyurethane, nitrile rubber, chlorine rubber, a vinyl chloride resin, a vinyl acetate resin, polyester resin, a phenol resin, a silicone resin, and the like. The adhesive layer may contain a conductive agent (for example, the electron conductive agent or ion conductive agent described above).

From the viewpoint of adhesion between the elastic layer and the support member, the thickness of the adhesive layer is preferably 1 μm or more and 50 μm or less, more preferably 2 μm or more and 40 μm or less, and still more preferably 5 μm or more and 20 μm or less.

The thickness of the adhesive layer is measured by imaging a section using an electron microscope. The thickness is measured at 4 positions at intervals of 90° in the circumferential direction at the center in the axial direction of the charging member, and the arithmetic average value is considered as the thickness of the adhesive layer.

[Surface Layer]

The surface layer preferably has conductivity and a volume resistivity of $1\times10^{3}$ Ω·cm or more and $1\times10^{14}$ Ω·cm or less at a temperature of 20° C. The volume resistivity of the surface layer is a value measured by a method described below.

The thickness of the surface layer is measured by a measurement method described below. The support member of the charging member is used as a negative electrode, and an aluminum plate having a width of 1.5 cm and wound one turn on the surface layer is used as a positive electrode. SI 1260 impedance/gain phase analyzer (Toyo Corporation) is used as a power source and ammeter, and 1296 dielectric interface (Toyo Corporation) is used as a current amplifier. An alternating current voltage of 1 Vp-p is applied at a frequency of 1 kHz to 0.01 Hz from the high frequency side. The resistance component of the impedance within a range of 100 Hz to 0.1 Hz is determined as the volume resistance value of the surface layer. The volume resistivity of the surface layer is calculated by a formula below.

$$\text{Volume resistivity } (\Omega\cdot\text{cm}) = \text{volume resistance } (\Omega)\times \text{area of positive electrode } (\text{cm}^2)/\text{thickness of surface layer (cm)}$$

The surface layer contains a resin, conductive particles, and non-conductive inorganic particles.

Examples of the resin include copolymer nylon resin, polyamide resin, polyimide resin, polyamide-imide resin, polyvinyl butyral resin, polyester resin, polyethylene terephthalate resin, polyarylate resin, polycarbonate resin, polyethylene resin, polyurethane resin, a phenol resin, a silicone resin, an acrylic resin, a fluorine-modified acrylic resin, a silicone-modified acrylic resin, a melamine resin, an epoxy resin, a fluorine resin, a polyvinylidene fluoride resin, a tetrafluoroethylene resin, ethylene-tetrafluoroethylene copolymer resin, tetrafluoroethylene-perfluoroalkyl vinyl ether copolymer resin, tetrafluoroethylene-hexafluoropropylene copolymer resin, fluororubber, a polyvinyl resin, polyvinyl alcohol resin, polyvinyl acetal resin, polyvinylidene chloride resin, polyvinyl chloride resin, ethylene-vinyl acetate copolymer resin, cellulose, a polythiophene resin, a resin mixture of two or more of these resins, a resin produced by curing or crosslinking at least one of these resins with a curing agent or a catalyst, and the like. These resins may be used alone or in combination of two or more.

From the viewpoint of suppressing contamination of the surface layer, the resin contained in the surface layer is preferably polyamide resin, a polyvinylidene fluoride resin, or a tetrafluoroethylene resin and more preferably polyamide resin. From the viewpoint of suppressing contamination of the surface layer, alcohol-soluble polyamide is preferred, alkoxymethylated polyamide (for example, alkoxymethylated nylon) is more preferred, and methoxymethylated polyamide (for example, methoxymethylated nylon) is still more preferred.

From the viewpoint of binding properties of the non-conductive particles, the surface layer preferably contains polyvinyl butyral resin.

In an exemplary embodiment, the surface layer contains polyamide resin and polyvinyl butyral resin as a binder resin. In this case, the mass ratio between both is preferably polyamide resin:polyvinyl butyral resin=95:5 to 65:35, more preferably 90:10 to 70:30, and still more preferably 85:15 to 75:25.

Examples of the conductive particles include carbon black, metal oxides such as tin oxide, titanium oxide, zinc oxide, and the like; and the like. The conductive particles contained in the surface layer are preferably carbon black. The types of conductive layers may be used alone or in combination of two or more.

From the viewpoint of excellent dispersibility in the resin, the average primary particle diameter of the conductive particles contained in the surface layer is preferably 10 nm or more and 50 nm or less.

The average primary particle diameter of the conductive particles is determined by measuring the long diameters of 100 conductive particles by observing the section of the surface layer using an electron microscope and arithmetically averaging the long diameters.

The content of the conductive particles contained in the surface layer relative to 100 parts by mass of the resin is preferably 5 parts by mass or more and 50 parts by mass or less, more preferably 8 parts by mass or more and 40 parts by mass or less, and still more preferably 10 parts by mass or more and 30 parts by mass or less.

The surface layer contains the non-conductive inorganic particles for the purpose of enhancing the heat dissipation of the charging member. The thermal conductivity of the non-conductive inorganic particles is preferably 20 W/(m·K) or more, more preferably 30 W/(m·K) or more, and still more preferably 40 W/(m·K) or more.

The thermal conductivity of the non-conductive inorganic particles may be, for example, 150 W/(m·K) or less, 120 W/(m·K) or less, or 100 W/(m·K) or less.

A method for measuring the thermal conductivity of the non-conductive inorganic particles includes measurement according to JIS R1611: 2010 "Measurement methods of thermal diffusivity, specific heat capacity, and thermal conductivity for fine ceramics by flash method". The particles to be measured are filled in a sample holder of a measurement device, and bulk density is adjusted by applying a load according to the specifications of the measurement device. The measurement is performed in an environment at a temperature of 23° C. and a relative humidity of 50%.

The non-conductive inorganic particles subjected to the measurement are non-conductive inorganic particles of a material which forms the surface layer or non-conductive inorganic particles taken out from the surface layer. A method for taking out the non-conductive inorganic particles from the surface layer is not limited. Examples of the method include a method for taking out the non-conductive inorganic particles by immersing the surface layer, separated from the charging member, in an organic solvent which dissolves a binder resin to dissolve the binder resin in the organic solvent, a method for taking out the non-conductive inorganic particles by heating the surface layer, separated from the charging member, to high temperature to cause the binder resin to disappear, and the like.

From the viewpoint of excellent thermal conductivity, the non-conductive inorganic particles are preferably fine ceramics particles. Examples of the fine ceramic particles include nitride particles, oxide particles, carbide particles, boride particles, and the like.

Example of nitride particles include particles of aluminum nitride, born nitride, and silicon nitride.

Examples of oxide particles include particles of magnesium oxide and aluminum oxide.

Examples of carbide particles include particles of silicon carbide.

Examples of boride particles include particles of titanium boride, niobium boride, molybdenum boride, and the like.

These types of particles may be used alone or in combination of two or more.

From the viewpoint of excellent thermal conductivity, the non-conductive inorganic particles are preferably at least one type selected from the group including nitride particles and oxide particles, and more preferably at least one type selected from the group including aluminum nitride particles, boron nitride particles, and magnesium oxide particles.

The average primary particle diameter of the non-conductive inorganic particles contained in the surface layer is preferably 5 μm or more and 20 μm or less, more preferably 5 μm or more and 15 μm or less, and still more preferably 5 μm or more and 10 μm or less.

When the average primary particle diameter of the non-conductive inorganic particles is 5 μm or more, fine irregularities (that is, discharge starting points of discharge to a photosensitive layer) can be formed in the surface of the surface layer.

When the average primary particle diameter of the non-conducive inorganic particles is 20 μm or less, a crack hardly occurs in the surface layer.

The average primary particle diameter of the non-conductive inorganic particles is determined by measuring the long diameters of 100 non-conductive inorganic particles in a section of the surface layer using an electron microscope, and then arithmetically averaging the measurement values.

From the viewpoint of excellent heat dissipation of the surface layer and the viewpoint of suppressing the occurrence of a crack, the content of the non-conductive inorganic particles contained in the surface layer relative to 100 parts by mass of the resin is preferably 5 parts by mass or more and 40 parts by mass or less, more preferably 10 parts by mass or more and 30 parts by mass or less, and still more preferably 15 parts by mass or more and 25 parts by mass or less.

The surface layer may contain various additives. Examples of the additives include a filler, a softener, a plasticizer, a curing agent, an antioxidant, a coupling agent, a surfactant, a defoaming agent, a leveling agent, and the like.

The thickness of the surface layer is preferably 1 μm or more and 25 μm or less, more preferably 3 μm or more and 20 μm or less, and still more preferably 5 μm or more and 15 μm or less.

The thickness of the surface layer is measured by imaging a section using an electron microscope. The thickness at the center in the axial direction of the charging member is measured at 4 positions at intervals of 90° in the circumferential direction, and the arithmetic average value thereof is considered as the thickness of the surface layer.

A method for forming the surface layer on the elastic layer is, for example, a method including coating, on the outer peripheral surface of the elastic layer, a surface layer forming composition prepared by mixing the resin, the conductive particle, the non-conductive inorganic particles, and other additives to form a layer of the surface layer forming composition, and then drying the layer of the surface layer forming composition. Examples of a method for coating the surface layer forming composition on the outer peripheral surface of the elastic layer include dip coating, roll coating, blade coating, wire bar coating, spray coating, beads coating, air knife coating, curtain coating, and the like.

<Charging Device, Image Forming Apparatus, and Process Cartridge>

A charging device according to an exemplary embodiment of the present disclosure includes the charging member according to the exemplary embodiment. The charging device according to the exemplary embodiment may be a charging device of a system in which the charging member is in contact with the surface of the photoreceptor, or a charging device of a system in which the charging member is not in contact with the surface of the photoreceptor. In the charging device of a system in which the charging member is in contact with the surface of the photoreceptor, the effect exhibited by the exemplary embodiment (density unevenness hardly occurs in an image, and a crack hardly occurs in the surface of the charging member) is remarkable.

An image forming apparatus according to an exemplary embodiment of the present disclosure includes a photoreceptor, a charging device which charges the surface of the photoreceptor, an electrostatic latent image forming device which forms an electrostatic latent image on the charged surface of the photoreceptor, a developing device which develops the electrostatic latent image formed on the surface of the photoreceptor with a developer containing a toner to form a toner image, and a transfer device which transfers the toner image to the surface of a recording medium. A charging device having the charging member according to the exemplary embodiment is applied as the charging device. The charging device may be a charging device of a system in which the charging member is in contact with the surface of the photoreceptor, or a charging device of a system in which the charging member is not in contact with the surface of the photoreceptor. In the charging device of a system in which the charging member is in contact with the surface of the photoreceptor, the effect exhibited by the exemplary embodiment (density unevenness hardly occurs in an image, and a crack hardly occurs in the surface of the charging member) is remarkable.

In the image forming apparatus according to the exemplary embodiment, for example, a portion including the photoreceptor and the charging device may have a cartridge structure (that is, a process cartridge according to an exemplary embodiment) detachable from the image forming apparatus. The process cartridge may include, other than the photoreceptor and the charging device, for example, at least one selected from the group including the electrostatic latent image forming device, the developing device, and the transfer device. The charging device may be a charging device of a system in which the charging member is in contact with the surface of the photoreceptor, or a charging device of a system in which the charging member is not in contact with the surface of the photoreceptor. In the charging device of a system in which the charging member is in contact with the surface of the photoreceptor, the effect exhibited by the exemplary embodiment (density unevenness hardly occurs in an image, and crack hardly occurs in the surface of the charging member) is remarkable.

Examples of an apparatus applied to the image forming apparatus according to the exemplary embodiment include well-known image forming apparatuses such as an apparatus provided with a fixing device which fixes a toner image transferred to the surface of a recording medium; an apparatus of a direct transfer system in which a toner image formed on the surface of a photoreceptor is transferred directly to a recording medium; an apparatus of an intermediate transfer system in which a toner image formed on the surface of a photoreceptor is first transferred to the surface of an intermediate transfer body, and then the toner image transferred to the surface of the intermediate transfer body is second transferred to the surface of a recording medium; an apparatus provided with a cleaning device which cleans the surface of the photoreceptor after transfer of the toner image and before charging; an apparatus provided with a static elimination device which eliminates electricity by irradiating elimination light to the surface of the photoreceptor after transfer of the toner image and before charging; an apparatus provided with a photoreceptor heating member which increases the temperature of the photoreceptor and decreases relative humidity; and the like.

In the apparatus of an intermediate transfer system, an example of a configuration applied to the transfer device includes an intermediate transfer body to the surface of which a toner image is transferred, a first transfer device which first transfers the toner image formed on the surface of the photoreceptor to the surface of the intermediate transfer body, and a second transfer device which second transfers the toner image transferred to the surface of the intermediate transfer body to the surface of a recording medium.

The image forming apparatus according to the exemplary embodiment may be any one of an image forming apparatus of a dry development system and an image forming apparatus of a wet development system (development system using a liquid developer).

An example of the image forming apparatus according to the exemplary embodiment is described below, but the image forming apparatus is not limited to this. A principal portion shown in the drawings is described, and description of other portions is omitted.

Figure 3:
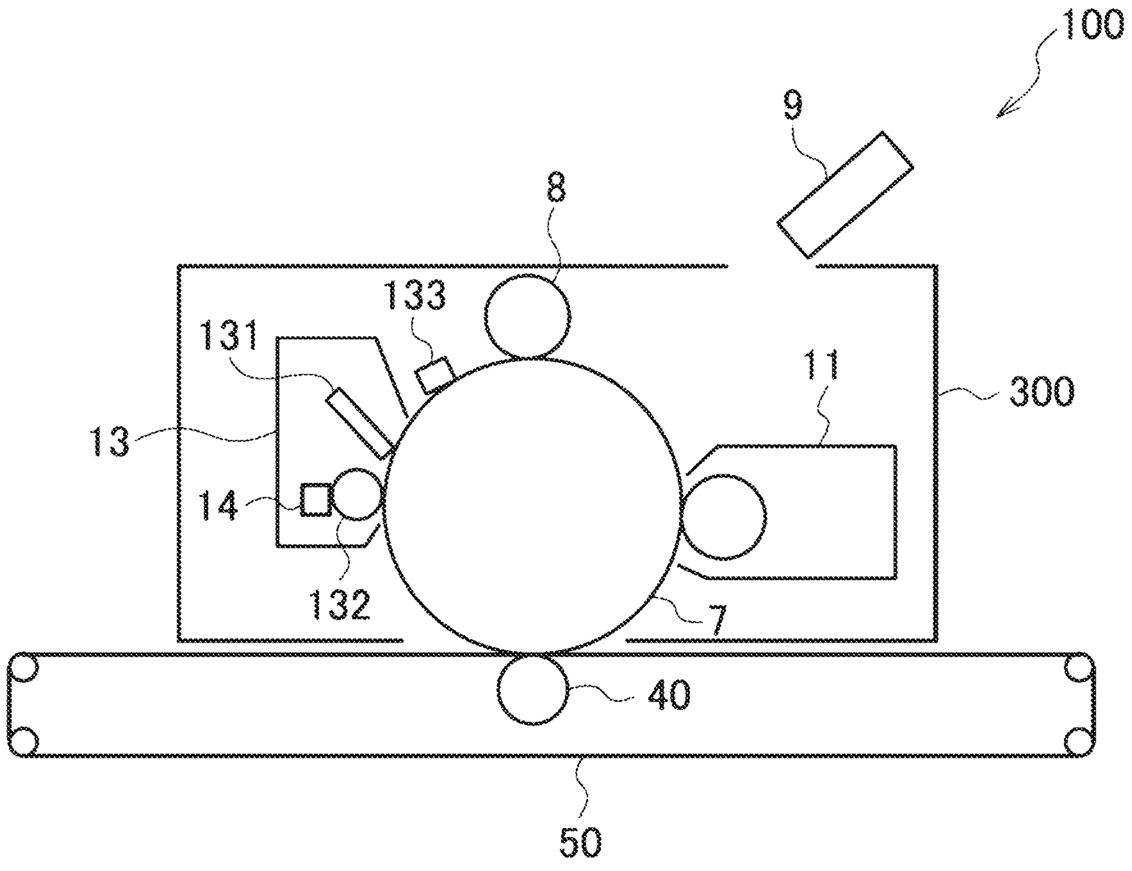
FIG. 3 is a schematic configuration diagram showing an example of an image forming apparatus according to an exemplary embodiment of the present disclosure.

FIG. 3 is a schematic configuration diagram showing an example of the image forming apparatus according to the exemplary embodiment.

As shown in FIG. 3, an image forming apparatus 100 according to the exemplary embodiment includes a process cartridge 300, an exposure device 9 (an example of the electrostatic latent image forming device), a transfer device 40 (first transfer device), and an intermediate transfer body 50. In the image forming apparatus 100, the exposure device 9 is disposed at a position where a photoreceptor 7 can be exposed to light from an opening of the process cartridge 300, the transfer device 40 is disposed at a position facing the photoreceptor 7 through the intermediate transfer body 50, and the intermediate transfer body 50 is disposed to be partially in contact with the photoreceptor 7. Although not shown in the drawing, a second transfer device which transfers the toner image transferred to the intermediate transfer body 50 to a recording medium (for example, paper) is also provided. The intermediate transfer body 50, the transfer device 40 (first transfer device), and the second transfer device (not shown) correspond to an example of the transfer device.

The process cartridge 300 shown in FIG. 3 includes the photoreceptor 7, a charging device 8, a developing device 11, and a cleaning device 13 which are integrally supported in a housing. The cleaning device 13 includes a cleaning blade (an example of the cleaning member) 131, and the cleaning blade 131 is disposed so as to be in contact with the surface of the photoreceptor 7. The cleaning member is not a form of the cleaning blade 131, and a conductive or insulating fibrous member may be used, and this may be used singly or used in combination with the cleaning blade 131.

FIG. 3 shows an example of the image forming apparatus which is provided with a fibrous member 132 (roll shape) which supplies a lubricant 14 to the surface of the photoreceptor 7 and a fibrous member 133 (flat brush shape) which supports cleaning, and these are disposed according to demand.

Each of the components of the image forming apparatus according to the exemplary embodiment is described below.

—Photoreceptor—

For example, the photoreceptor 7 has a structure in which an undercoat layer and a photosensitive layer are laminated in this order on a conductive substrate. The photosensitive layer may be a single-layer photosensitive layer or a laminated photosensitive layer including a charge generating layer and a charge transporting layer.

—Charging Device—

The charging device 8 includes the charging member according to the exemplary embodiment. The charging device 8 may be a charging device of a system in which the charging member is in contact with the surface of the photoreceptor or a charging device of a system in which the charging member is not in contact with the surface of the photoreceptor. The charging device may be any one of a charging device of a system (DC charging system) in which only a direct current voltage is applied to the charging member, a charging device of a system (AC charging system) in which only an alternating current voltage is applied to the charging member, and a charging device of a system (AC/DC charging system) in which a voltage, which is an alternating current voltage superimposed on a direct current voltage, is applied to the charging member.

—Exposure Device—

The exposure device 9 is, for example, an optical device in which the surface of the photoreceptor 7 is exposed in a predetermined image pattern to light such as semiconductor laser light, LED light, liquid crystal shutter light, or the like. The wavelength of a light source is within the spectral sensitivity range of the photoreceptor. The mainstream of the wavelength of semiconductor laser is near-infrared light having an oscillation wavelength near 780 nm. However, the wavelength is not limited to this, and a laser having an oscillation wavelength on the order of 600 nm or a laser as a blue laser having an oscillation wavelength of 400 nm or more and 450 nm or less may be used. Also, a surface light-emitting laser light source of a type which can output multi-beam for forming a color image is effective.

—Developing Device—

The developing device 11 is, for example, a general developing device which develops with a developer in a contact or non-contact manner. The developing device 11 is not particularly limited as long as it has the function described above and is selected according to purposes. Examples thereof include a well-known developing device having the function of adhering a one-component developer or a two-component developer to the photoreceptor 7 by using a brush, a roller, or the like. In particular, a developing roller maintaining a developer in the surface thereof is preferred.

The developer used in the developing device 11 may be a one-component developer containing only a toner or a two-component developer containing a toner and a carrier. Also, the developer may be either magnetic or nonmagnetic. A known developer is used as these developers.

—Cleaning Device—

A device of a cleaning blade system provided with the cleaning blade 131 is used as the cleaning device 13. Besides the cleaning blade system, a fur brush cleaning system and a simultaneous development-cleaning system may be used.

—Transfer Device—

Examples of the transfer device 40 include a contact-type transfer charger using a belt, a roller, a film, a rubber blade, or the like; and themselves well-known transfer chargers such as scorotron transfer charger and corotron transfer charger using corona discharge, and the like.

—Intermediate Transfer Body—

A belt shape (intermediate transfer belt) containing polyimide, polyamide-imide, polycarbonate, polyarylate, polyester, rubber, or the like, which is imparted with semiconductivity, is used as the intermediate transfer body 50. Besides the belt shape, a drum shape may be used as the form of the intermediate transfer body.

Figure 4:
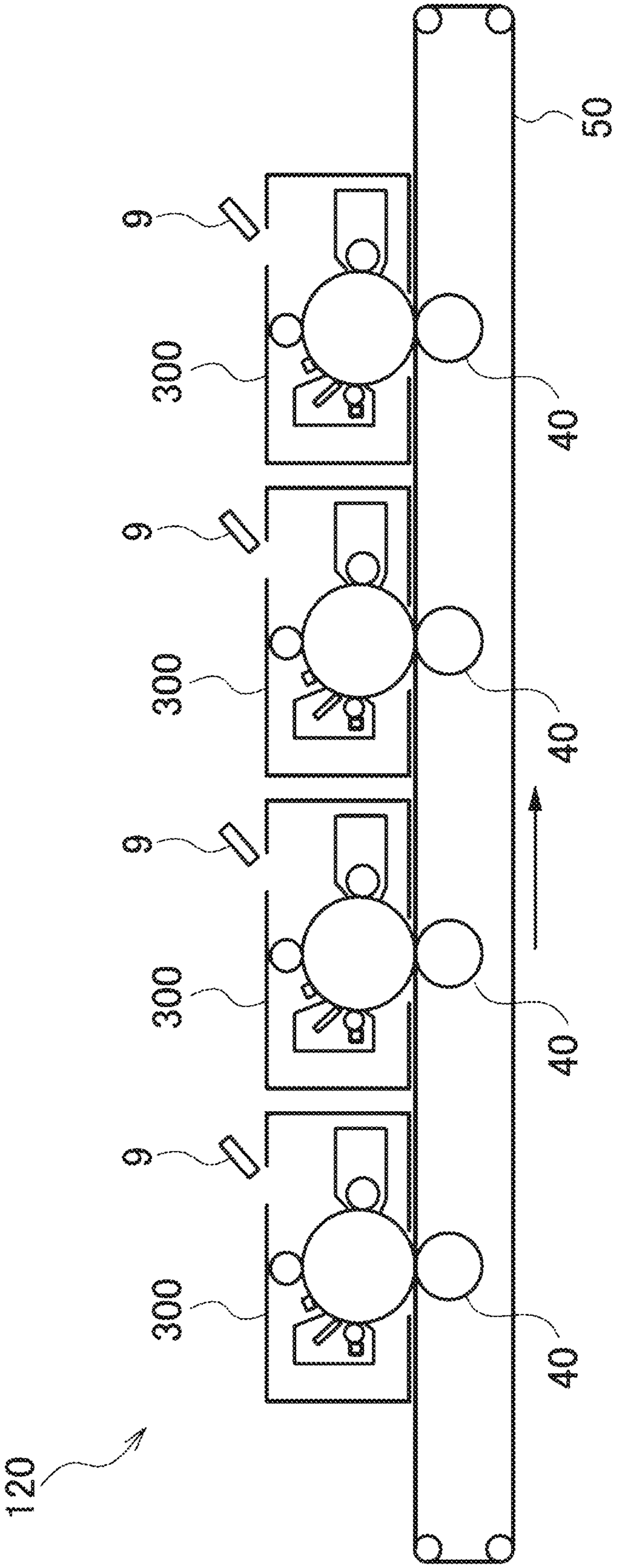
FIG. 4 is a schematic configuration diagram showing another example of an image forming apparatus according to an exemplary embodiment of the present disclosure.

FIG. 4 is a schematic configuration diagram showing another example of the image forming apparatus according to the exemplary embodiment.

An image forming apparatus 120 shown in FIG. 4 is a multicolor image forming apparatus of a tandem type mounted with four process cartridges 300. The image forming apparatus 120 has a configuration in which the four process cartridges 300 are disposed in parallel on the intermediate transfer body 50 and one photoreceptor is used for each color. The image forming apparatus 120 has the same configuration as the image forming apparatus 100 except that a tandem system is used.

EXAMPLES

An exemplary embodiment of the present disclosure is described in detail below by using examples, but the exemplary embodiment of the present disclosure is not limited to these examples.

In description below, "parts" and "%" are on a mass basis unless otherwise specified. In description below, synthesis, production, treatment, and measurement are performed at room temperature (25° C.±3° C.).

<Production of Charging Roller>

Example 1

—Preparation of Support Member—

A cylindrical member made of SUM22 is subjected to electroless nickel plating with a thickness of 5 μm, preparing a support member having a diameter of 8 mm.

—Formation of Adhesive Layer—

Chlorinated polypropylene resin (maleic anhydride chlorinated polypropylene resin, Superchlon 930, Nippon Paper Industries Co., Ltd.): 100 parts Epoxy resin (EP4000, ADEKA Corporation): 10 parts Conductive agent: carbon black (Ketjen black EC, Ketjen Black International Company): 2.5 parts Toluene: proper amount The materials described above are mixed and treated for 1 hour by using a ball mill, producing a resin composition. The resultant resin composition is coated on the surface of the support member with a brush, forming an adhesive layer having a thickness of 10 μm.

—Formation of Elastic Layer—

Epichlorohydrin rubber (Gechron 3106, Zeon Corporation): 100 parts

Electron conductive agent: carbon black (Asahi #60, Asahi Carbon Co., Ltd.): 10 parts Ion conductive agent: benzyl triethyl ammonium chloride (Lion Corporation): 5 parts
Calcium carbonate (Whiton SB, Shiraishi Calcium Co., Ltd.): 20 parts
Vulcanizing agent: sulfur (Vulnoc R, Ouchi Shinko Chemical Industrial Co., Ltd.): 1 part
Vulcanization accelerator: stearic acid (NOF Corporation): 1 part
Vulcanization accelerator: zinc oxide: 1.5 parts The materials described above are mixed, kneaded by using a tangential pressure kneader, and passed through a strainer to form a rubber composition. The resultant rubber composition is kneaded by using an open roller and molded into a roll shape on the surface of the adhesive layer by using a molding machine. Next, the molded product is heated for 70 minutes by using a heating furnace at a temperature of 175° C., producing an elastic layer. The elastic layer is polished to produce a conductive elastic roller having a diameter of 14 mm.

—Formation of Surface Layer—

Resin: N-methoxymethylated nylon (F30K, Nagase Chemtex Corporation): 80 parts
Resin: polyvinyl butyral (S-LEC BL-1, Sekisui Chemical Co., Ltd.): 20 parts
Conductive particles: carbon black (MONAHRCH 1000, Cabot Corporation): 12 parts
Non-conductive particles: aluminum nitride particles (AINO50AW, Thrutek Co., Ltd.): 8 parts
Additive: dimethyl polysiloxane (BYK-307, BYK Chemie Japan KK): 0.8 parts The materials described above are mixed, diluted with methanol/1-prpanol, and then dispersed by using a beads mill. The resultant dispersion liquid is coated on the surface of the conducive elastic roller by dip coating in an environment at a temperature of 24° C. and a relative humidity of 45% and dried by heating for 30 minutes at a temperature of 130° C., forming a surface layer having a thickness of 10 μm. Consequently, a charging roller of Example 1 is obtained.

Comparative Example 1

A charging roller is produced by the same method as in Example 1 except that the non-conductive particles are changed to polyamide particles (Orgasol, Arkema Co., Ltd.) and used in an addition amount (number of parts relative to 100 parts by mass of resin) described in Table 1.

Examples 2 and 3 and Comparative Examples 2 and 3

A charging roller is produced by the same method as in Example 1 except that the addition amount (number of parts relative to 100 parts by mass of resin) of aluminum nitride particles is changed as described in Table 1.

Examples 4 to 6

A charging roller is produced by the same method as in Example 1 except that the non-conductive particles are changed to boron nitride particles (PT620, Momentive Performance Materials Inc.) and used in an addition amount (number of parts relative to 100 parts by mass of resin) described in Table 1.

Examples 7 to 9

A charging roller is produced by the same method as in Example 1 except that the non-conductive particles are changed to magnesium oxide particles (RF-10C-AC, Ube Material Industries, Ltd.) and used in an addition amount (number of parts relative to 100 parts by mass of resin) described in Table 1.

Example 10

A charging roller is produced by the same method as in Example 1 except that the non-conductive particles are changed to aluminum oxide particles (DAW-03, Denka Company Limited) and used in an addition amount (number of parts relative to 100 parts by mass of resin) described in Table 1.

Examples 11 to 13

A charging roller is produced by the same method as in Example 1 except that the non-conductive particles are changed to aluminum nitride particles having a different particle diameter from Example 1 and used in an addition amount (number of parts relative to 100 parts by mass of resin) described in Table 1.

The aluminum nitride particles used in Examples 11 to 13 are as follows. The average primary particles diameters of the aluminum nitride particles are shown in Table 2.

Example 11: AINO20AW, Thrutek Co., Ltd.
Example 12: AINO300AW, Thrutek Co., Ltd.
Example 13: AINO200AW, Thrutek Co., Ltd.

<Performance Evaluation of Charging Member>

[Thermal Conductivity]

The layers from the elastic layer to the surface layer in a central portion in the axial direction of the charging member are cut out to 5 mm in the axial direction×2 mm in the circumferential direction, forming a sample. The sample is placed on a probe of a thermal diffusivity measuring device ai-Phase Mobile (ai-Phase Co., Ltd.) at room temperature (25° C.±3° C.), and a weight of 100 gf is set. Measurement is performed three times in manual mode under the conditions including a voltage of 1.41 V, a frequency of 1 Hz to 10 Hz (divided into 10 parts), and a measurement time of 2 seconds, and an average value is calculated.

[Density Unevenness]

The produced charging roller is mounted on an image forming apparatus Apeos C2360 (Fujifilm Business Innovation Corp.).

A black halftone image with a density of 50% is output on the entire surface on one side of each of 400,000 sheets of A3-size plain paper in an environment at a temperature of 28° C. and a relative humidity of 80%. Then, a black halftone image with a density of 30% is output on the entire surface on one side of 1 sheet of A3-size plain paper in an environment at a temperature of 10° C. and a relative humidity of 15%.

The image density is measured at one central point and four ends of the black halftone image with a density of 30% using reflection densitometer X-Rite 404A (X-Rite Co., Ltd.). A difference between the maximum value and the minimum value of image density is calculated and classified as follows.

1: A difference in image density is less than 0.3.
2: A difference in image density is within an allowable range of 0.3 or more and 1.0 or less.
3: A difference in image density is over 1.0 and unallowable.

[Crack]

The surface of the charging roller after evaluation of density unevenness is observed using an optical microscope. The presence of a crack and the width of a crack are classified as follows.

0: No crack is present.

1: A crack is present, and the crack width is less than 10 μm and the crack length is less than 0.5 mm.

2: A crack is present, and the crack width is less than 10 μm and the crack length is 0.5 mm or more.

3: A crack with a width of 10 μm or more is present.

(((2)))

The charging member described in (((1))), in which the thermal conductivity of the non-conductive inorganic particles is 40 W/(m·k) or more.

(((3)))

The charging member described in (((1))) or (((2))), in which the non-conductive inorganic particles contain at least one type selected from the group including nitride particles, oxide particles, carbide particles, and boride particles.

(((4)))

The charging member described in any one of (((1))) to (((3))), in which the non-conductive inorganic particles contain at least one type selected from the group including aluminum nitride particles, boron nitride particles, and magnesium oxide particles.

TABLE 1

| | Non-conductive particle | | | | | Charging member | Evaluation | |
|---|---|---|---|---|---|---|---|---|
| | Type — | Volume resistivity Ω · cm | Thermal conductivity W/(m · K) | Average primary particle diameter μm | Addition amount Parts by mass | Thermal conductivity W/(m · K) | Density unevenness — | Crack — |
| Comparative Example 1 | Polyamide | 1 × $10^{9}$ | 0.24 | 5 | 8 | 0.26 | 3 | 0 |
| Comparative Example 2 | Al nitride | 1 × $10^{13}$ | 90 | 5 | 4 | 0.38 | 3 | 0 |
| Example 1 | Al nitride | 1 × $10^{13}$ | 90 | 5 | 8 | 0.40 | 2 | 0 |
| Example 2 | Al nitride | 1 × $10^{13}$ | 90 | 5 | 20 | 1.10 | 1 | 0 |
| Example 3 | Al nitride | 1 × $10^{13}$ | 90 | 5 | 40 | 2.30 | 1 | 0 |
| Comparative Example 3 | Al nitride | 1 × $10^{13}$ | 90 | 5 | 42 | 2.80 | 1 | 3 |
| Example 4 | Boron nitride | 1 × $10^{15}$ | 60 | 20 | 8 | 0.50 | 2 | 0 |
| Example 5 | Boron nitride | 1 × $10^{15}$ | 60 | 20 | 20 | 0.80 | 1 | 0 |
| Example 6 | Boron nitride | 1 × $10^{15}$ | 60 | 20 | 40 | 1.80 | 1 | 1 |
| Example 7 | Mg oxide | 1 × $10^{17}$ | 50 | 10 | 8 | 0.40 | 2 | 0 |
| Example 8 | Mg oxide | 1 × $10^{17}$ | 50 | 10 | 20 | 0.70 | 1 | 0 |
| Example 9 | Mg oxide | 1 × $10^{17}$ | 50 | 10 | 40 | 1.00 | 1 | 1 |
| Example 10 | Al oxide | 1 × $10^{15}$ | 32 | 5 | 20 | 0.49 | 2 | 0 |
| Example 11 | Al nitride | 1 × $10^{13}$ | 90 | 2 | 20 | 0.53 | 2 | 0 |
| Example 12 | Al nitride | 1 × $10^{13}$ | 90 | 30 | 8 | 0.40 | 2 | 1 |
| Example 13 | Al nitride | 1 × $10^{13}$ | 90 | 20 | 40 | 2.10 | 1 | 2 |

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A charging member including a support member, an elastic layer provided on the support member, and a surface layer provided on the elastic layer, in which the surface layer contains a resin, conductive particles, and non-conductive inorganic particles; and the surface layer contains 5 parts by mass or more and 40 parts by mass or less of the non-conductive inorganic particles relative to 100 parts by mass of the resin.

(((5)))

The charging member described in any one of (((1))) to (((4))), in which the average primary particle diameter of the non-conductive inorganic particles is 5 μm or more and 20 μm or less.

(((6)))

A charging device including the charging member described in any one of (((1))) to (((5))).

(((7)))

A process cartridge including a photoreceptor, and a charging device which includes the charging member described in any one of (((1))) to (((5))) and charges the surface of the photoreceptor, the process cartridge being detachable from an image forming apparatus.

(((8)))

An image forming apparatus including a photoreceptor, a charging device which includes the charging member described in any one of (((1))) to (((5))) and charges the surface of the photoreceptor, an electrostatic latent image forming device which forms an electrostatic latent image on the charged surface of the photoreceptor, a developing device which develops the electrostatic latent image formed on the surface of the photoreceptor with a developer containing a toner to form a toner image, and a transfer device which transfers the toner image to the surface of a recording medium.

What is claimed is:

1. A charging member comprising:

a support member, an elastic layer provided on the support member, and a surface layer provided on the elastic layer, wherein the surface layer contains a resin, conductive particles, and non-conductive inorganic particles; and the surface layer contains 5 parts by mass or more and 40 parts by mass or less of the non-conductive inorganic particles relative to 100 parts by mass of the resin.

2. The charging member according to claim 1, wherein the thermal conductivity of the non-conductive inorganic particles is 40 W/(m·k) or more.

3. A charging device comprising the charging member according to claim 2.

4. A process cartridge comprising a photoreceptor, and a charging device that includes the charging member according to claim 2 and charges the surface of the photoreceptor, the process cartridge being detachable from an image forming apparatus.

5. An image forming apparatus comprising:

a photoreceptor;

a charging device that includes the charging member according to claim 2 and charges the surface of the photoreceptor;

an electrostatic latent image forming device that forms an electrostatic latent image on the charged surface of the photoreceptor;

a developing device that develops the electrostatic latent image formed on the surface of the photoreceptor with a developer containing a toner to form a toner image; and a transfer device that transfers the toner image to the surface of a recording medium.

6. The charging member according to claim 1, wherein the non-conductive inorganic particles contain at least one type selected from the group consisting of nitride particles, oxide particles, carbide particles, and boride particles.

7. A charging device comprising the charging member according to claim 6.

8. A process cartridge comprising a photoreceptor, and a charging device that includes the charging member according to claim 6 and charges the surface of the photoreceptor, the process cartridge being detachable from an image forming apparatus.

9. An image forming apparatus comprising:

a photoreceptor;

a charging device that includes the charging member according to claim 3 and charges the surface of the photoreceptor;

an electrostatic latent image forming device that forms an electrostatic latent image on the charged surface of the photoreceptor;

a developing device that develops the electrostatic latent image formed on the surface of the photoreceptor with a developer containing a toner to form a toner image; and a transfer device that transfers the toner image to the surface of a recording medium.

10. The charging member according to claim 1, wherein the non-conductive inorganic particles contain at least one type selected from the group consisting of aluminum nitride particles, boron nitride particles, and magnesium oxide particles.

11. A charging device comprising the charging member according to claim 10.

12. A process cartridge comprising a photoreceptor, and a charging device that includes the charging member according to claim 10 and charges the surface of the photoreceptor, the process cartridge being detachable from an image forming apparatus.

13. An image forming apparatus comprising:

a photoreceptor;

a charging device that includes the charging member according to claim 10 and charges the surface of the photoreceptor;

an electrostatic latent image forming device that forms an electrostatic latent image on the charged surface of the photoreceptor;

a developing device that develops the electrostatic latent image formed on the surface of the photoreceptor with a developer containing a toner to form a toner image; and a transfer device that transfers the toner image to the surface of a recording medium.

14. The charging member according to claim 1, wherein the average primary particle diameter of the non-conductive inorganic particles is 5 μm or more and 20 μm or less.

15. A charging device comprising the charging member according to claim 6.

16. A process cartridge comprising a photoreceptor, and a charging device that includes the charging member according to claim 14 and charges the surface of the photoreceptor, the process cartridge being detachable from an image forming apparatus.

17. An image forming apparatus comprising:

a photoreceptor;

a charging device that includes the charging member according to claim 10 and charges the surface of the photoreceptor;

an electrostatic latent image forming device that forms an electrostatic latent image on the charged surface of the photoreceptor;

a developing device that develops the electrostatic latent image formed on the surface of the photoreceptor with a developer containing a toner to form a toner image; and a transfer device that transfers the toner image to the surface of a recording medium.

18. A charging device comprising the charging member according to claim 1.

19. A process cartridge comprising a photoreceptor, and a charging device that includes the charging member according to claim 1 and charges the surface of the photoreceptor, the process cartridge being detachable from an image forming apparatus.

20. An image forming apparatus comprising:

a photoreceptor;

a charging device that includes the charging member according to claim 1 and charges the surface of the photoreceptor;

an electrostatic latent image forming device that forms an electrostatic latent image on the charged surface of the photoreceptor;

a developing device that develops the electrostatic latent image formed on the surface of the photoreceptor with a developer containing a toner to form a toner image; and a transfer device that transfers the toner image to the surface of a recording medium.

* * * * *